No. 12,772. REISSUED MAR. 31, 1908.

H. P. HUSBY.

ROTARY FOLDING MECHANISM FOR PRINTING PRESSES.

APPLICATION FILED FEB. 25, 1908.

3 SHEETS—SHEET 1.

Witnesses:
Bad Perry
Robert A. Weir

Inventor:
Hans P. Husby
by
Burns Adams, Pickard & Jackson
Attys.

No. 12,772. REISSUED MAR. 31, 1908.

H. P. HUSBY.

ROTARY FOLDING MECHANISM FOR PRINTING PRESSES.

APPLICATION FILED FEB. 25, 1908.

3 SHEETS—SHEET 2.

Witnesses:

Robert N. Wells

Inventor:

Hans P. Husby by Bond Adams, Pickard & Jackson

Attys.

No. 12,772. REISSUED MAR. 31, 1908.

H. P. HUSBY.

ROTARY FOLDING MECHANISM FOR PRINTING PRESSES.

APPLICATION FILED FEB. 25, 1908.

3 SHEETS—SHEET 3.

Witnesses:

B. A. Perry

Robert N. Weir

Inventor:

Hans P. Husby by Bond Adams, Pickard & Jackson

Attys.

UNITED STATES PATENT OFFICE.

HANS P. HUSBY, OF CHICAGO, ILLINOIS, ASSIGNOR TO THE GOSS PRINTING PRESS COMPANY, OF CHICAGO, ILLINOIS, A CORPORATION OF ILLINOIS.

ROTARY FOLDING MECHANISM FOR PRINTING-PRESSES.

No. 12,772. Specification of Reissued Letters Patent. Reissued Mar. 31, 1908.

Original No. 870,964, dated November 12, 1907, Serial No. 376,513. Application for reissue filed February 25, 1908. Serial No. 417,683.

*To all whom it may concern:*

Be it known that I, HANS P. HUSBY, a citizen of the United States, residing at Chicago, in the county of Cook and State of Illinois, have invented certain new and useful Improvements in Rotary Folding Mechanism for Printing-Presses, of which the following is a specification, reference being had to the accompanying drawings.

My invention relates to rotary folding mechanism for printing presses, and has particularly for its object to provide a new and improved folding mechanism for transversely folding paper upon the run, and which will operate at a greater speed than has hitherto been practical.

Figure 1:
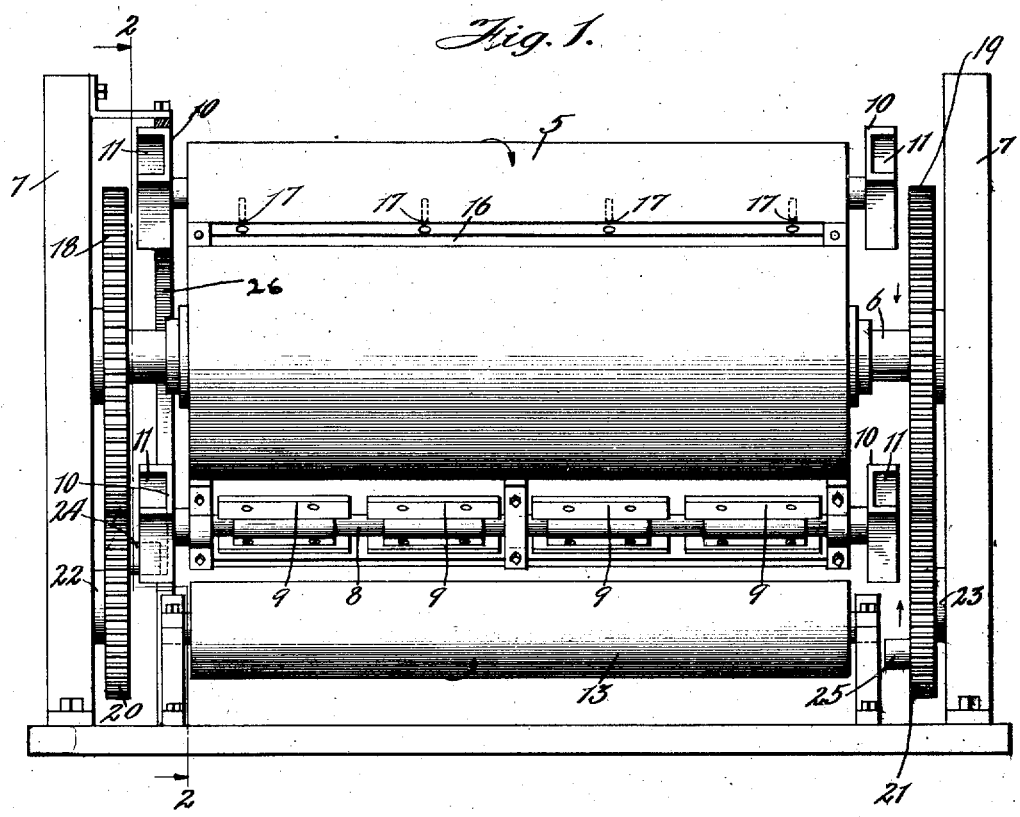
Figure 4:
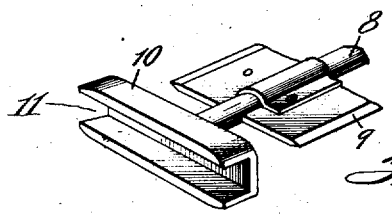
Figure 2:
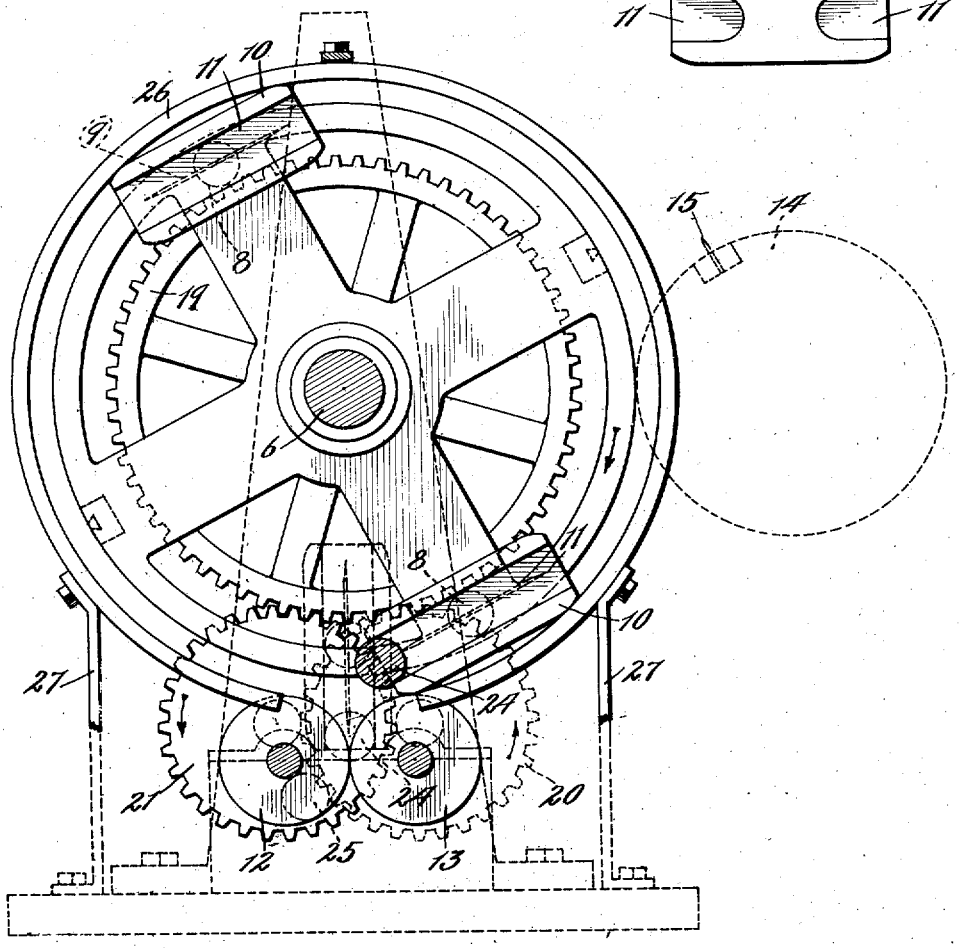
Figure 4A:
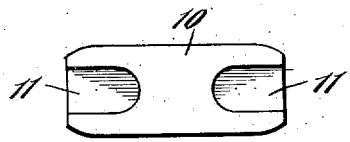
Figure 3:
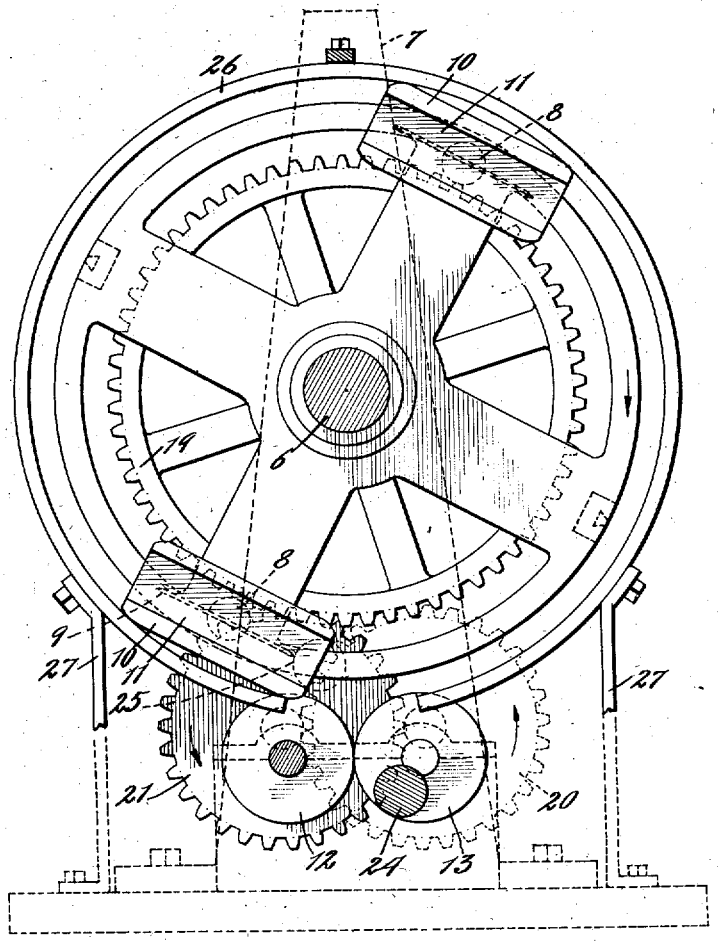

In the drawings,—Figure 1 is a front elevation; Fig. 2 is a section on line 2—2 of Fig. 1, showing the coacting cutting cylinder in dotted lines; Fig. 3 is a section on line 2—2 of Fig. 1, showing the folding knives and slotted cross-heads in another position; Fig. 4 is a detail, being a perspective view of one end of one of the shafts carrying the folding knives and showing the slotted head; and Fig. 4[a] is an end view of a modified form of cross-head.

Referring to the drawings,—5 indicates a folding cylinder mounted on a shaft 6 which is suitably journaled in the side-frames 7 of the folder frame. Said cylinder carries one or more shafts 8, each carrying a folding blade 9, which is preferably made in sections, as is best shown in Fig. 1. These shafts, with their folding blades, are preferably two in number mounted diametrically opposite each other, as is best shown in Figs. 2 and 3, although the number, of course, may be varied. Each of said shafts carries at its end a cross-head 10, which is provided with a longitudinal slot or groove 11 running from end to end of the cross-head.

12—13 indicate folding rollers placed near the periphery of the folding cylinder 5, where they may receive the sheets thrust between them by the folding blade and complete the transverse fold, as hereinafter described.

14 (shown in dotted lines in Fig. 2) indicates a cutting cylinder, which, when the folding cylinder 5 is used as a cutting as well as well as a folding cylinder, coöperates with the cylinder 5 to sever transversely the webs into sheets, for the folding of which my mechanism is particularly designed. The folding cylinder, folding rollers and cutting cylinder 14 are driven by any suitable mechanism. I prefer to use my folding cylinder also as a cutting cylinder, and have so illustrated it in the drawings.

15 (see Fig. 2) indicates a cutting-knife mounted upon the cutting cylinder 14.

16 indicates a block, which is let into the surface of the folding cylinder 5 and secured thereto in the usual manner.

17 indicates pins which impale the lead end of the sheet and which, forming no part of my present invention, are illustrated only conventionally, and may be operated in any well-known and approved manner.

18—19 indicate gears, which are keyed, or otherwise secured, to the shaft 6 exterior to the cylinder.

20—21 indicate gears, which are journaled upon studs 22—23 mounted upon the side-frame 7 of the folder.

24—25 indicate pins or studs, which are mounted upon the inner surface of the gears 20—21 and are of a size adapted to enter, engage and move freely within the grooves 11 upon the cross-heads 10. With the construction shown, in which the folding cylinder carries two folding blades diametrically opposite each other, I prefer to make the gears 18 and 19 two to one with reference to the gears 20—21, and when so constructed each of the gears 20—21 will carry a single stud or pin.

26 indicates a guide whose inner surface is circular and concentric with the axis of the folding cylinder 5 and supported upon the folder frame by supports 27. The portion of the guide 26 which lies immediately above the folding rollers 12 and 13 is cut away to permit the operation of the cross-heads, as hereinafter described.

The operation of the mechanism above described is as follows. Referring to Figs. 2 and 3, the arrows indicate the direction of rotation of the several parts. Fig. 2 shows the position of the parts just after the stud or pin 24 has engaged the slot in one of the cross-heads 10. The mechanism being set in operation, the cross-heads bearing upon the inner surface of the guides 26 are carried around with the folding cylinder in the position in which they are shown in Figs. 2 and 3, being retained in that position by their bearing upon the inner surface of the guide 26. In this position it will be obvious that the folding blades are out of operative position. As the parts are carried around by the rotation of the cylinder and the several gears, they are so adjusted that just as they reach the position shown in Fig. 2 the forward or lead end of the groove 11 of one of the cross-heads 10 engages the pin 24. The speed of the gears 18—19 being two to one with reference to that of the gears 20—21, the cross-head is carried around at a greater speed than the pin 24. In consequence of this as the pin 24 moves downward the cross-head is rocked into the position shown in dotted lines in Fig. 2, rocking with it the shaft 8 and the folding blades 9,—thus thrusting the paper into the bite of the folding rollers 12 and 13. It will be understood, of course, that in Figs. 2 and 3, which are sectional views on line 2—2 of Fig. 1, the gear 20 is shown by dotted lines. When the cross-heads and folding blades have reached the position shown in dotted lines in Fig. 2, the stud 25 at the other end of the machine is just entering the groove in the head 10 upon the other end of the machine. As the grooved head 10 upon the other, or right-hand, end of the machine—the one farthest away in Figs. 2 and 3—is carried around, the pin 25 engaging the slot rocks the cross-head 10 and with it the shaft 8 and the folding blades 9 into the position shown in Fig. 3, thus withdrawing the folding blade from operative position. In this position the cross-head 10 becomes engaged again with the inner surface of the guide 26 and is carried around as before. As the cylinder rotates, the cross-head upon the opposite side of the cross-head first engaged becomes engaged successively by the pins 24 and 25, as above described, and operates in its turn to thrust the paper into the bite of the folding rollers.

It will be apparent from the above description that inasmuch as the cylinder and the gears 20 and 21 rotate in opposite directions the stud 24 and the cross-head which it engages will be traveling in the same direction and continue to travel in substantially the same direction during their engagement in throwing the knife into operating position, and that the pin 25 and the head which it engages will be traveling in the same general direction from the time of their engagement until the time of their disengagement in throwing the knife out of its folding position and back into its normal position. It will also be apparent that, in view of the above facts, and also in view of the fact that the cross-heads are engaged while in their normal position with the folding knife at right angles to the radius of the wheels intersecting its axis and are disengaged as the parts are returned to their normal position again with the cross-head in position to enter the guide 26, the operation of the knife will be performed smoothly and without violent contact of parts. This is greatly conducive to the attainment of a high degree of speed in the operation of the mechanism, and by means of these devices I believe that a higher speed may be maintained than has hitherto been deemed practicable or possible.

I have illustrated and shown my mechanism as rotating in the direction shown by the arrows in the several figures. This has been done for purposes of convenience of description, as it is perfectly obvious that the parts may rotate in the opposite direction and the operation be the same.

In the above description I have described the cross-heads as provided with a groove which runs longitudinally of the cross-heads and the length thereof, and they are so shown in Figs. 1, 2, 3 and 4 of the drawings. This is the form in which I prefer to make them on account of ease of construction, but it will be obvious from the above description that only that portion of the groove 11 which lies near the ends of the cross-heads is engaged by the stud or operative. I have shown, therefore, in Fig. 4ª a modified form of the cross-head, in which instead of a longitudinal groove or slot opening at both ends and traversing the length of the cross-head it is provided with two grooves or recesses 11 entering one from each end of the cross-head and of sufficient depth to insure the proper operation and clearance, and this form may be used without in any way departing from the spirit of my invention. It will be therefore understood that when I use the expression "grooved cross-head" or "groove" in either the specification or claims it is not intended to be limited to a slot which runs longitudinally the entire length of the cross-head, but is to be understood as including equivalent forms of structure, such, for instance, as that shown in Fig. 4ª.

So far as I am aware, no one has heretofore provided a folding device for perfecting presses, or analogous uses, in which a folding blade carried by a rotating carrier has been arranged to be rocked so as to be projected into folding position and to be retracted into normal or carrying position by means of a plurality of moving members arranged to act upon the folding blade while moving in the same direction to successively move or project it from normal into folding position and to retract it from folding back to normal position, thus avoiding knocking or violent contact between the operating parts by which the folding is effected.

That which I claim as my invention, and desire to secure by Letters Patent, is,—

1. The combination with a folding cylinder, a shaft carried thereby, a folding blade mounted on said shaft, and a cross-head at each end of said shaft exterior to the folding cylinder and provided with a groove, of rotating members at each end of said cylinder, a stud carried by each of said rotating members and adapted to enter and engage the groove upon said cross-head to operate said folding blade as the cylinder rotates, and folding rollers coacting with said folding blade.

2. The combination with a folding cylinder, a shaft carried thereby, a folding blade mounted on said shaft, and a cross-head at each end of said shaft exterior to the folding cylinder and provided with a groove, of rotating members at each end of said cylinder, a stud carried by each of said rotating members and adapted to enter and engage the groove upon said cross-head to operate said folding blade as the cylinder rotates, a guide adapted to bear on the cross-head upon one side of said machine and hold said folding blade out of operative position when not engaged by said studs, and folding rollers coacting with said folding blade.

3. The combination with a folding cylinder, a folding blade carried thereby and folding rollers coacting with said folding blade, of a cross-head connected with said folding blade at one end of the cylinder and provided with a groove, a rotating member, a stud carried thereby and adapted to enter and engage said groove to rock said blade into operative position as the cylinder rotates, a cross-head connected with said folding blade upon the other side of said cylinder and provided with a groove, a rotating member, and a pin carried by said rotating member adapted to enter and engage the groove on said second-named cross-head and to rock the said folding blade out of operative position as the cylinder rotates.

4. The combination of a folding cylinder, a folding blade carried thereby, and a plurality of moving members adapted to successively act upon said folding blade only and while moving in the same direction therewith to move it into and out of folding position.

5. The combination of a folding cylinder, a folding blade carried thereby, and a plurality of rotating members adapted to successively act upon said folding blade only and while moving in the same direction therewith to move it into and out of folding position.

6. The combination with a folding cylinder, and a folding blade carried thereby, of a rotating member adapted while moving in the same direction to act upon said blade while in normal position and move it into folding position, and a second rotating member adapted to engage and act upon said blade while in folding position and while moving in the same direction to move said blade out of folding position and discharge it in normal position.

7. The combination of a folding cylinder, a folding blade carried thereby, means connected with said folding blade and adapted to be actuated to move said blade into and out of folding position, and a plurality of rotating members adapted to successively engage said means while moving in the same direction therewith to move said folding blade into and out of folding position.

8. A rotary folding device, comprising a rotary carrier, a folding blade carried thereby, and a plurality of moving guides coöperating to operatively engage said folding blade while moving in the same direction to move said folding blade from its normal position into folding position and from folding position back again into normal position.

9. The combination of a folding cylinder, a folding blade carried thereby, folding rollers coacting with said folding blade, and a plurality of moving guides adapted to operate to move said folding blade into and out of folding position, said guides being arranged to move in the same direction, such direction to be opposite to the direction of rotation of the folding cylinder.

10. The combination of a folding cylinder, a folding blade carried thereby, folding rollers coacting with said folding blade, an operating member carried by said folding blade, and a moving guide at each end of said cylinder adapted to engage said operating member on said folding blade while moving in the same direction to operate said folding blade as the cylinder rotates.

HANS P. HUSBY.

Witnesses:
J. J. WALSER,
GEO. A. EDDY.